(12) United States Patent
Kosecoff

(10) Patent No.: US 11,210,925 B1
(45) Date of Patent: Dec. 28, 2021

(54) METHODS FOR DETERMINING PRESENCE OF BLUETOOTH DEVICE

(71) Applicant: L'OREAL, Paris (FR)

(72) Inventor: David B. Kosecoff, San Francisco, CA (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 17/000,022

(22) Filed: Aug. 21, 2020

(51) Int. Cl.
| | |
|---|---|
| *G07C 9/00* | (2020.01) |
| *B60R 25/24* | (2013.01) |
| *G01S 5/00* | (2006.01) |
| *G08B 21/24* | (2006.01) |
| *H04W 4/80* | (2018.01) |
| *H04B 17/318* | (2015.01) |

(Continued)

(52) U.S. Cl.
CPC .......... *G08B 21/24* (2013.01); *G08B 21/182* (2013.01); *G08B 21/22* (2013.01); *H04B 17/318* (2015.01); *H04W 4/80* (2018.02)

(58) Field of Classification Search
CPC .... G08B 21/0247; G08B 21/22; G08B 21/24; G08B 21/0261; G08B 21/0272; G08B 25/10; G08B 5/36; H04W 4/80; H04W 12/08; H04W 4/021; H04W 4/029; H04W 4/04; H04W 4/35; H04W 64/00; A01K 15/023; A01K 27/009; B60N 2/002; B60N 2/28; B60R 1/00; B60R 25/24; B60R 25/40; E05B 49/00; G01S 5/009; G02C 11/10; G05B 15/02; G05B 19/042; G05B 2219/25011; G05B 2219/2642; G07C 2009/00357; G07C 9/00309; G08G 1/127; G16H 10/65; G16H 40/20; G16H 40/63; G16Y 10/80; G16Y 20/40; G16Y 40/35; G16Y 40/60; G16Z 99/00; H04L 12/2818; H04L 12/2829; H04L 67/04; H04L 67/12; H04L 67/125; H04L 67/18; H04L 67/22; H04L 67/2833; H04L 67/306; H04M 1/72403; H04M 1/72406; H04M 1/72412; H04M 1/72451; Y02D 30/70

See application file for complete search history.

(56) References Cited

U.S. PATENT DOCUMENTS

| | | | |
|---|---|---|---|
| 10,713,923 B1 * | 7/2020 | Sacks | G08B 21/24 |
| 2013/0045685 A1 * | 2/2013 | Kiani | G08B 21/24 |
| | | | 455/41.2 |
| 2014/0307600 A1 | 10/2014 | Dumitrescu et al. | |

(Continued)

OTHER PUBLICATIONS

Darmon, L., "Wireless for Wearables," Embedded Computing Design, Nov. 20, 2014, <https://www.embedded-computing.com/embedded-computing-design/wireless-for-wearables> [retrieved Aug. 20, 2020>, 5 pages.

(Continued)

*Primary Examiner* — Dionne Pendleton
(74) *Attorney, Agent, or Firm* — Christensen O'Connor Johnson Kindness PLLC

(57) ABSTRACT

A method for identifying a Bluetooth device by a smart device is disclosed herein. The method includes acquiring a signal from the Bluetooth device by the smart device and comparing a strength of the signal with a predetermined threshold signal strength. If the strength of the signal is less than the predetermined threshold strength, a warning about the misplaced Bluetooth device is generated by the smart device.

19 Claims, 4 Drawing Sheets

(51) Int. Cl.
    *G08B 21/22*     (2006.01)
    *G08B 21/18*     (2006.01)

(56) References Cited

U.S. PATENT DOCUMENTS

| | | | |
|---|---|---|---|
| 2019/0080539 A1* | 3/2019 | Yoshikawa | E05B 49/00 |
| 2020/0314233 A1 | 10/2020 | Mohalik et al. | |
| 2020/0375149 A1* | 12/2020 | Anderton | H04W 4/80 |

OTHER PUBLICATIONS

French Search Report and Written Opinion, dated Jun. 4, 2021, issued in corresponding French Application No. 2010175, filed Oct. 6, 2020, 11 pages.

* cited by examiner

METHODS FOR DETERMINING PRESENCE OF BLUETOOTH DEVICE

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Bluetooth communication is ubiquitous. Creating wireless networks that reduce the need for wired connections has wide-reaching commercial, industrial, and military applications, among others. Bluetooth has allowed development of a multitude of wearable devices, giving a user a freedom of motion without tripping hazards or being otherwise burdened by wires.

As technology progresses, Bluetooth may be utilized in applications where devices are relatively small, wearable, inconspicuous, or otherwise capable of being easily misplaced. Additionally, users may forget to wear or activate Bluetooth devices as they leave their home, work, or other location. Therefore, systems and methods are needed for improved detection of Bluetooth devices, as well as systems and methods for reminding users to take with them and locate their Bluetooth devices.

In one embodiment, a method for identifying a Bluetooth device by a smart device includes: acquiring a signal from the Bluetooth device by the smart device; comparing a strength of the signal with a predetermined threshold strength of the signal; and if the strength of the signal is less than the predetermined threshold strength, generating, by the smart device, a warning about the misplaced Bluetooth device.

In one aspect, the predetermined threshold strength is calibrated by a user based on a target location for Bluetooth device attachment.

In another aspect, the predetermined threshold strength is coded into the Bluetooth device.

In one aspect, the predetermined threshold strength is unique to the specific Bluetooth device. In another aspect, the predetermined threshold strength is unique to the specific model of Bluetooth device.

In one embodiment, the method further includes checking for the signal of the Bluetooth device periodically by the smart device.

In one embodiment, the method further includes checking for the signal of the Bluetooth device by the smart device based on a demand by a user. In one aspect, the predetermined signal strength threshold is met when the Bluetooth device is within a proximity range from the smart device.

In one aspect, the proximity range is calibrated by a user. In another aspect, the proximity range is 1 meter. In yet another aspect, the proximity range is half a meter.

In one embodiment, the method further includes alerting a user as to a location of the misplaced Bluetooth device.

In one aspect, the Bluetooth device is a first Bluetooth device, and the method further includes verifying at least one extrinsic condition. If the extrinsic condition is met, the method includes acquiring a second signal from a second Bluetooth device by the smart device and comparing a strength of the second signal with the predetermined threshold strength. If the strength of the second signal is less than the predetermined threshold strength, the method includes generating, by the smart device, a warning about the misplaced second Bluetooth device.

In another aspect, the extrinsic condition is a forecasted weather condition. In yet another aspect, the forecasted weather condition is selected from a group consisting of a temperature, an ultra-violet (UV) light level, a pollution, a pollen count, and a humidity.

In one aspect, the extrinsic condition is a time of day, a scheduled activity or an unmet fitness goal. In another aspect, the extrinsic condition is a location of the smart device.

In one aspect, the extrinsic condition is a user history based on collected data about a target exposure to sunlight that generates required amount of D vitamin for a user.

In one embodiment, the Bluetooth device is selected from a group consisting of a wearable UV sensor, a wearable Blue Light sensor, a wearable pollution sensor, a wearable sweat monitor, a wearable pH monitor, a wearable temperature monitor, a wearable glucose monitor, a personal nametag, a wearable activity monitor, an asset-tracking tag, a proximity marketing beacon, and a navigation beacon.

In one aspect, the Bluetooth device is disposable or non-rechargeable.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

In some embodiments, the inventive technology includes a smart device (e.g., a smartphone) and a Bluetooth device connected via a wireless network. In some embodiments, the Bluetooth device is relatively small or inconspicuous, therefore easy to misplace or forget. In operation, the smart device recognizes a signal sent by the Bluetooth device. The smart device may scan for the Bluetooth device periodically, and in other embodiments the smart device scans for the Bluetooth device on demand by the user. In some embodiments, the smart device recognizes the signal strength of the signal sent by the Bluetooth device. A predetermined signal strength threshold or proximity range may be hardcoded or calibrated into the Bluetooth device. In some embodiments, the smart device generates a user warning when the signal strength of the Bluetooth device is lower than that of the predetermined signal strength threshold, indicating that a distance between the Bluetooth device and the smart device has exceeded the proximity threshold. The warning may alert the user as to the present location of the Bluetooth device.

In some embodiments, the smart device issues a warning to the user if an extrinsic condition is present, i.e., a time of day, forecasted weather conditions (i.e., temperature, UV level, humidity, pollution level, pollen count, etc.) a location, etc., in addition to a distance exceeding the proximity range. In some embodiments, the warning may be issued multiple times a day. In some embodiments, a combination of extrinsic conditions can trigger a warning. In some embodiments, a first Bluetooth device verifies the extrinsic condition and issues a warning about a second misplaced Bluetooth device. In some embodiments, the warning alerts the user as to the dynamic location of the second Bluetooth device.

Figure 1:
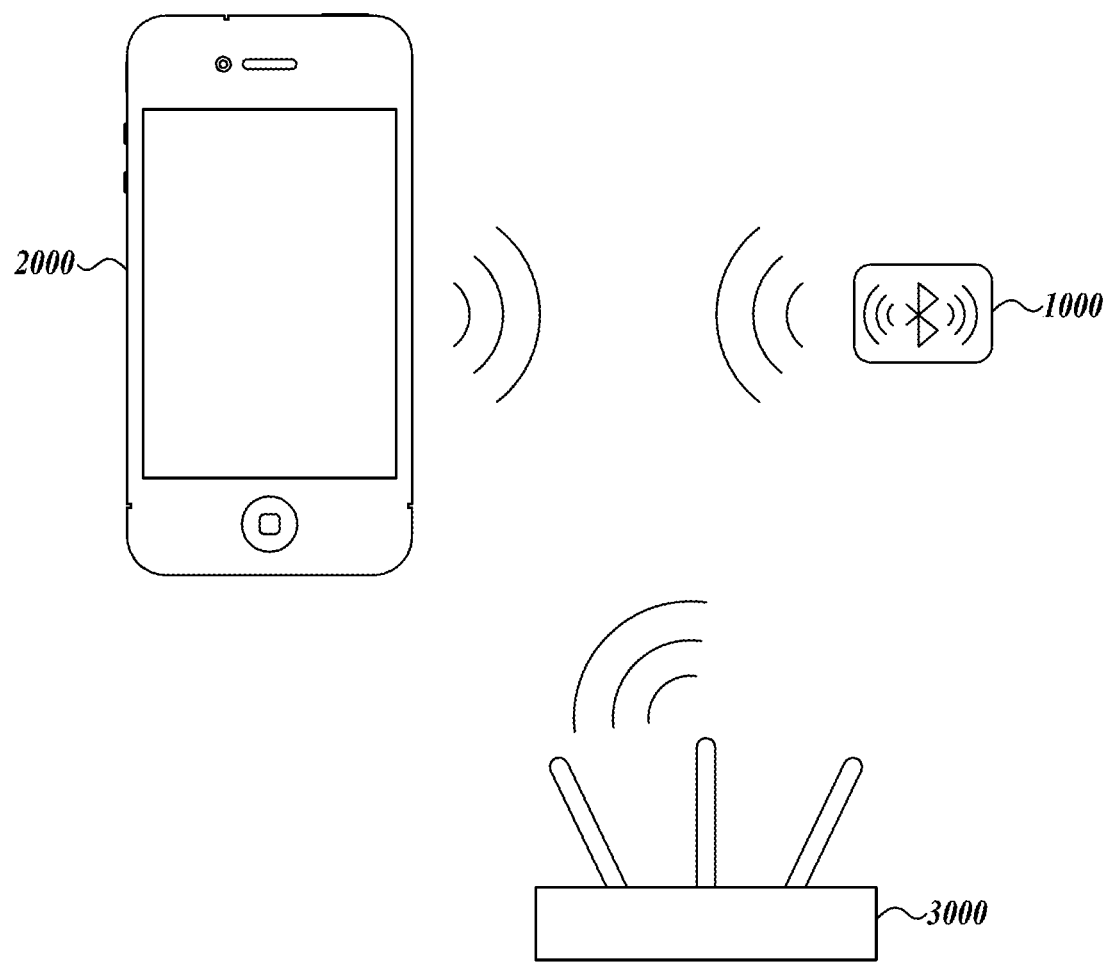
FIG. 1 is an embodiment of an example interaction between a Bluetooth device and a smart device in accordance with the present technology.

FIG. 1 is an embodiment of an example interaction between a Bluetooth device 1000 and a smart device (also referred to as a host device) 2000 in accordance with the present technology. The smart device 2000 is communicatively coupled to a Bluetooth device 1000 through a wireless network 3000. The wireless network 3000 may be WiFi, LTE, and the like. The smart device 2000 is illustrated as a cellphone, but in other embodiments the smart device 2000 may take the form of any number of other computing/communication devices such as a smart watch, a tablet, and the like.

In some embodiments, the Bluetooth device 1000 is wearable, e.g., on a hat, pocket, sleeve, bag, or the like. The Bluetooth device 1000 may be relatively small, or inconspicuous, meaning that a user may forget to bring it with them when they leave a location. In some embodiments, the Bluetooth device 1000 may take the form of a button or pin Some non-limiting examples of the Bluetooth devices 1000 are a wearable UV or Blue Light sensor, a wearable pollution (e.g., NO2, PM2.5, etc.) sensor, a wearable sweat monitor, a wearable pH monitor, a wearable temperature monitor, a wearable glucose monitor, a personal nametag/bib tag, a wearable activity monitor, an asset-tracking tag, a proximity marketing beacon, and a navigation beacon. In some embodiments, these Bluetooth devices may be single use (e.g., disposable, non-rechargeable, non-battery replaceable, etc.). In operation, the smart device 2000 acquires a signal from the Bluetooth device 1000.

Figure 2:
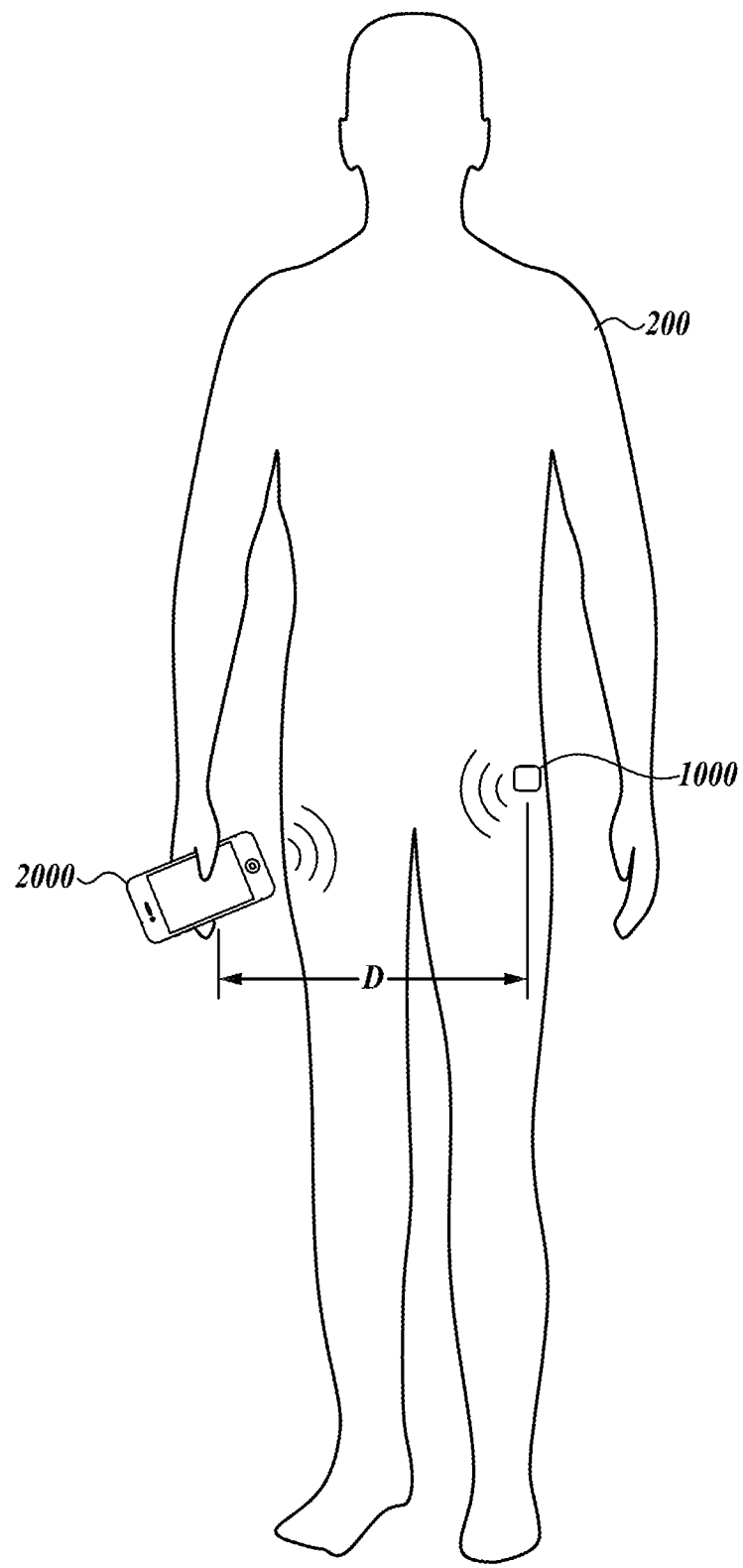
FIG. 2 is an embodiment of an example interaction between a Bluetooth device and a smart device in accordance with the present technology.

FIG. 2 is an embodiment of an example interaction between a Bluetooth device 1000 and a smart device 2000 in accordance with the present technology. In some embodiments, a user 200 holds the smart device 2000. In other embodiments, the smart device 2000 is otherwise near the user 200, for example, in the user's pocket. The Bluetooth device 1000 and the smart device 2000 are separated by a distance (or proximity range) D.

In operation, the Bluetooth device 1000 sends a signal to the smart device 2000. The signal is stronger or weaker depending on the distance between the Bluetooth device 1000 and the smart device 2000. In some embodiments, the smart device 2000 scans for the signal from the Bluetooth device 1000 periodically. In other embodiments, the smart device 2000 scans for the Bluetooth device on demand. The smart device 2000 may identify the Bluetooth device 1000 through a unique identification string (e.g., a string of symbols).

The smart device 2000 may recognize predetermined signal strength threshold associated with a specific Bluetooth device 1000. In some embodiments, the smart device recognizes the predetermined signal strength threshold associated with a specific model or type of Bluetooth device 1000. In some embodiments, the predetermined signal strength threshold of the Bluetooth device 1000 is preprogrammed. In other embodiments, the predetermined signal strength threshold of the Bluetooth device 1000 is calibrated by the user 200.

The signal strength detected by the smart device 2000 depends on distance between the smart device 2000 and the Bluetooth device 1000. In some embodiments, if the distance between the smart device 2000 and the Bluetooth device 1000 is within the distance (or proximity range) D, the smart device does not generate a user alert. In this scenario, the assumption is that the Bluetooth device 1000 is attached to user's body. In some embodiments, the distance D is one meter. In some embodiments, the distance D is half a meter. In some embodiments, the distance D can be adjusted to the user's preference. In other embodiments, the distance D can be adjusted to the type or model of Bluetooth device 1000. In another embodiment, the distance D can be hardcoded into the Bluetooth device 1000. As explained above, the distance D is representative of a signal strength threshold. The smart device 2000 may alert the user 200 if the Bluetooth device's 1000 signal is lower than the signal strength threshold. In some embodiments, the user 200 can calibrate the signal strength threshold to their preferences or body proportions i.e., the distance from their hip to their head for a Bluetooth device 1000 located on a hat (or other target location on user's body).

Figure 3:
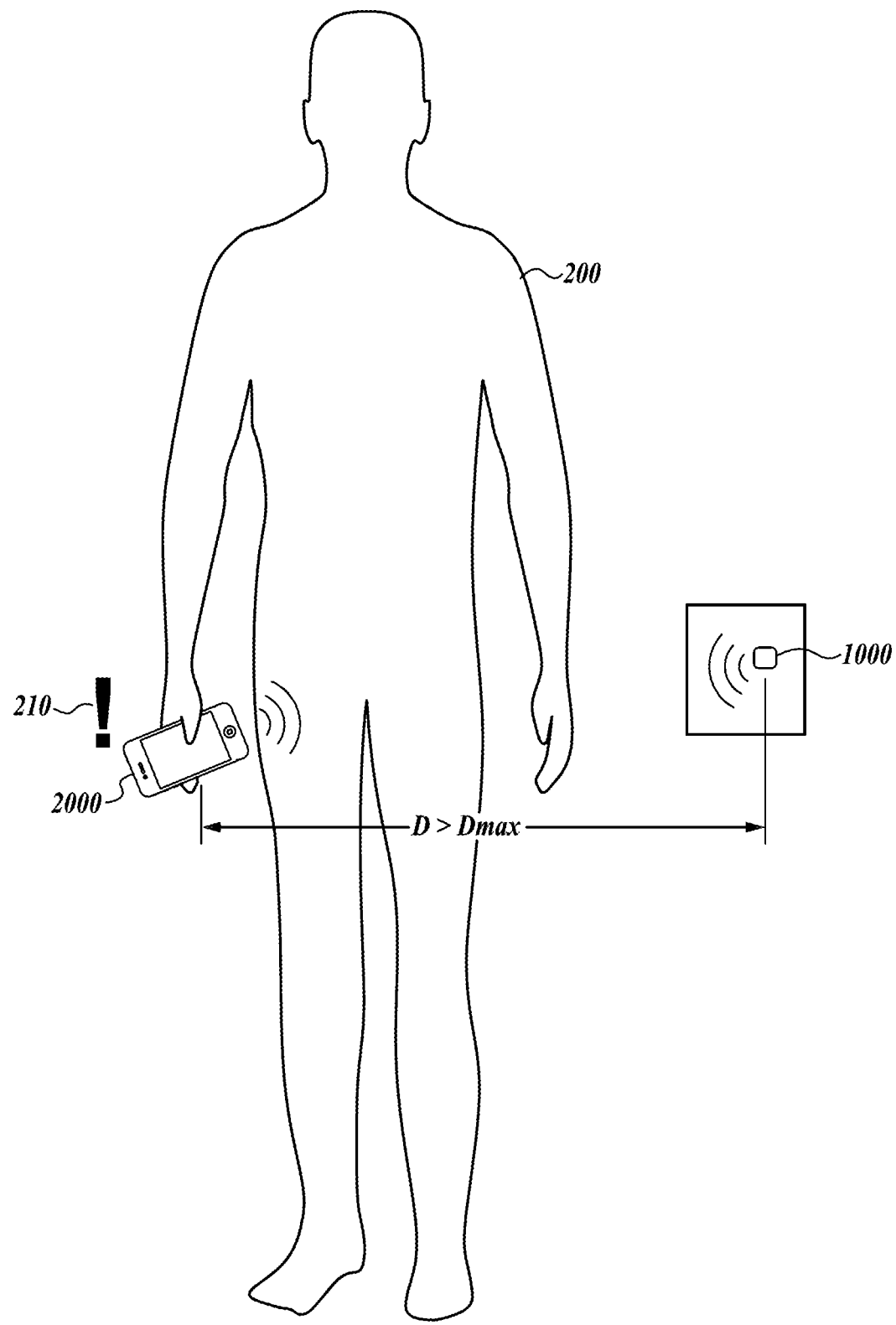
FIG. 3 is an embodiment of an example interaction between a Bluetooth device and a smart device in accordance with the present technology.

FIG. 3 is an embodiment of an example interaction between a Bluetooth device 1000 and a smart device 2000 in accordance with the present technology. In one embodiment, the user 200 holds the smart device 2000. In the illustrated embodiment, the distance between the smart device 2000 and the Bluetooth device 1000 exceeds the proximity range $D_{max}$, causing the signal strength to fall below a predetermined threshold.

In operation, the Bluetooth device 1000 sends a signal to the smart device 2000. In some embodiments, when the distance between the smart device 2000 and the Bluetooth device 1000 exceeds the maximum distance, $D_{max}$, the smart device 2000 detects that the signal strength coming from the Bluetooth device is insufficient. In response, the smart device 2000 generates a warning 210. The warning 210 may alert the user 200 to wear the Bluetooth device. In some embodiments the warning 210 tells the user 200 the general location of the Bluetooth device 1000 in order to aid the user 200 in finding the Bluetooth device 1000. In some embodiments, based on the signal strength of the Bluetooth device 1000 as detected by the smart device 2000, the warning 210 may give the user 200 the dynamic location of the Bluetooth device 1000. In some embodiments, the smart device 2000 locates the Bluetooth device 1000 using geofencing.

In some embodiments, the warning 210 is triggered by a distance greater than $D_{max}$ between the smart device 2000 and the Bluetooth device 1000, and at least one extrinsic condition. In some embodiments, the extrinsic condition may be generated from one device, such as the smart device 1000, to aid in finding or wearing second Bluetooth device 2000. In other embodiments, determination whether the Bluetooth device 1000 is within a prescribed range may be made by a Bluetooth device 2000 that lacks smart device capabilities, instead being a Bluetooth device with a built-in capability of determining distances from other Bluetooth devices.

In some embodiments, the extrinsic condition is a time of day. For example, some Bluetooth devices may be suitable for attaching on the user's body only during the working hours, while generally not being worn outside of the working hours. In other embodiments, the extrinsic conditions are related to the weather forecast. For example, the extrinsic condition may be a temperature and the warning 210 is triggered only if the temperature is within a predetermined range of temperatures. In another embodiment, the extrinsic condition is a UV level, therefore a range of UV levels triggers the warning 210. For example, the warning 210 about the absence of a UV detector Bluetooth device 100 is only triggered if the UV level is above a predetermined threshold. In other embodiments, the weather conditions are humidity, pollution level, pollen count, etc. In some embodiments, the extrinsic condition is based on user's history (e.g., based on collected data for the user). Such user history may be based on a target exposure to sunlight that generates required amount of D vitamin. In some embodiments, the extrinsic condition is a location. For example, the warning 210 is issued to the user 200 as they leave a location, such as their home or workplace. In some embodiments, the warning 210 may be triggered by a combination of extrinsic conditions, i.e., a temperature and a UV level. The extrinsic conditions may be related to a scheduled activity, like, for example, fitness activity or related to unmet fitness goal. For example, the warning 210 may be issued to the user 200 if Bluetooth fitness meter is missing from the user's body as the user leaves for a fitness activity. In some embodiments, the warning 210 is triggered multiple times during the day. The extrinsic condition could be selected by a user 200 or can be coded into the Bluetooth device 1000 or the smart device 2000.

Figure 4:
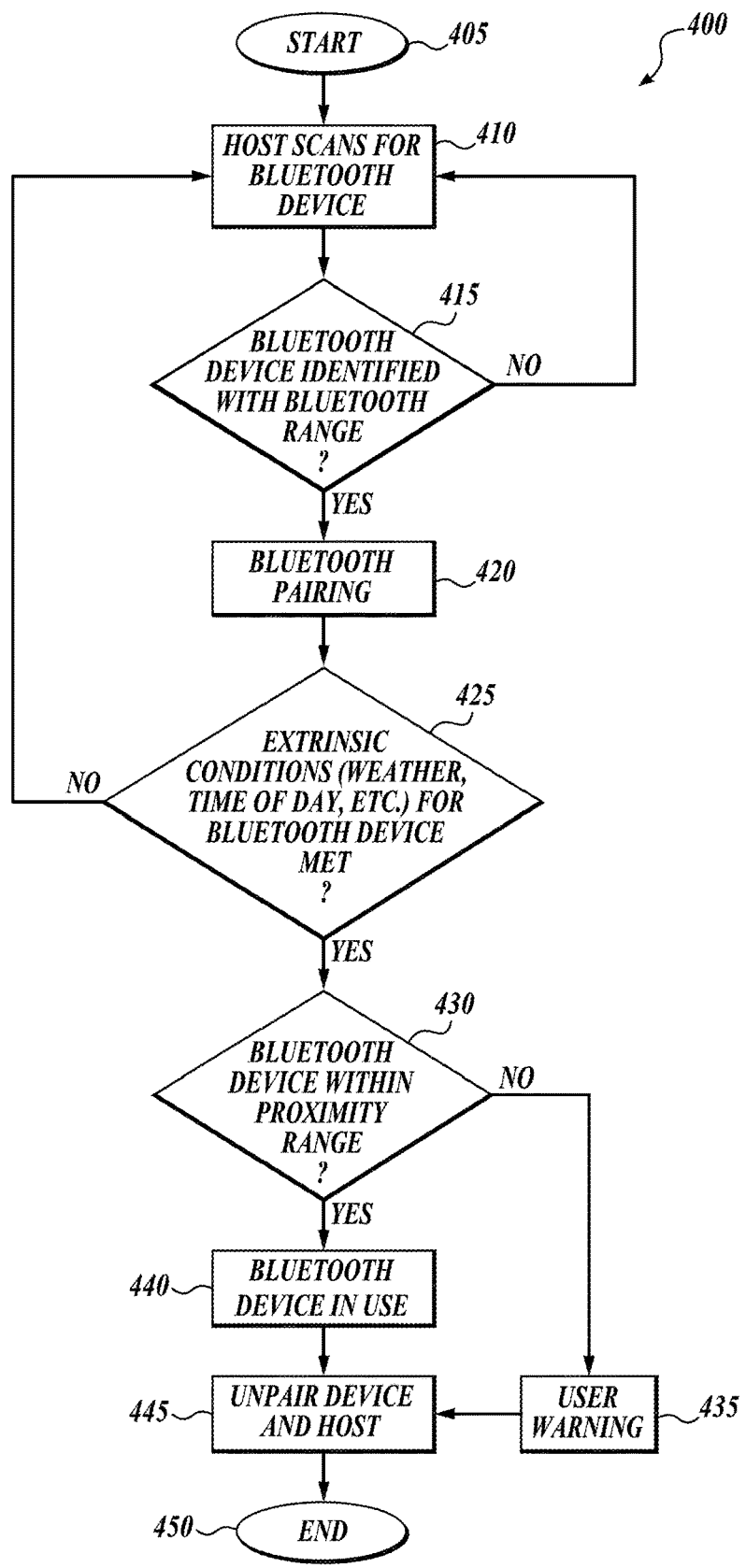
FIG. 4 is a flowchart of a method of determining the presence of a Bluetooth device in accordance with the present technology.

FIG. 4 is a flowchart of a method of determining the presence of a Bluetooth device in accordance with the present technology. In some embodiments, the method may include additional steps or may be practiced without all steps illustrated in the flow chart.

The method 400 begins in block 405. In block 410, the host device (e.g., the smart device 1000) scans for the Bluetooth device. In block 415, if the host device does not identify the Bluetooth device (i.e., if the Bluetooth device is not within range, the Bluetooth device is turned off, etc.) the method returns to block 410. If the Bluetooth device is within a range that allows it to be recognized by the host device, the method proceeds to block 420. In block 420, the host device and the Bluetooth device are paired.

In some embodiments, in block 425, the host device determines whether at least one extrinsic condition is met. If the extrinsic condition(s) are not met, the method returns to block 410. If the extrinsic condition(s) are met, the method proceeds to block 430. In block 430, the host device determines, based on the signal strength of the Bluetooth device, if the Bluetooth device is within the proximity range (e.g., D in FIGS. 2-3). In some embodiments, the smart device periodically checks if the Bluetooth device is within the proximity range. In other embodiments, the user can request the smart device check for the Bluetooth device on demand.

If the Bluetooth device is within the proximity range or the signal strength threshold, the method proceeds to block 440. In block 440, the Bluetooth device is attached to the user's body during its normal use. If the Bluetooth device is not within the proximity range (e.g., distance between the Bluetooth device and the smart device exceeds $D_{max}$ in FIG. 3) the method proceeds to block 435. In block 435, a user warning (e.g., the warning 210 shown in FIG. 3) is generated by the host device (smart device) 2000. In some embodiments, the user warning alerts the user that the Bluetooth device is not on their person. In other embodiments, the user warning helps the user find the Bluetooth device by giving the user a general location where the Bluetooth device is located. Eventually, when the user is finished with the Bluetooth device, in block 445, the Bluetooth and the host device are unpaired. In block 450, the method ends.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. For example, in some embodiments the counter or controller may be based on a low-power buck regulator connected to a capacitor. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The present application may also reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," etc., mean plus or minus 5% of the stated value.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

What is claimed is:

1. A method for identifying a Bluetooth device by a smart device, the method comprising:
acquiring a first signal from a first Bluetooth device by the smart device;
comparing a strength of the first signal with a predetermined threshold strength of the signal;

if the strength of the first signal is less than the predetermined threshold strength, generating, by the smart device, a warning about the misplaced first Bluetooth device;

verifying at least one extrinsic condition, wherein the at least one extrinsic condition includes a user history based on collected data about a target exposure to sunlight that generates required amount of D vitamin for a user;

if the extrinsic condition is met:
acquiring a second signal from a second Bluetooth device by the smart device, and
comparing a strength of the second signal with the predetermined threshold strength; and if the strength of the second signal is less than the predetermined threshold strength, generating, by the smart device, a warning about the misplaced second Bluetooth device.

2. A method for identifying a Bluetooth device by a smart device, the method comprising:

acquiring a first signal from a first Bluetooth device by the smart device;

comparing a strength of the first signal with a predetermined threshold strength of the signal;

if the strength of the first signal is less than the predetermined threshold strength, generating, by the smart device, a warning about the misplaced first Bluetooth device;

verifying at least one extrinsic condition, wherein the at least one extrinsic condition includes a forecasted weather condition;

if the extrinsic condition is met:
acquiring a second signal from a second Bluetooth device by the smart device, and
comparing a strength of the second signal with the predetermined threshold strength; and if the strength of the second signal is less than the predetermined threshold strength, generating, by the smart device, a warning about the misplaced second Bluetooth device.

3. The method of claim 2, wherein the predetermined threshold strength is calibrated by a user based on a target location for Bluetooth device attachment.

4. The method of claim 2, wherein the predetermined threshold strength is coded into the first or the second Bluetooth device.

5. The method of claim 2, wherein the predetermined threshold strength is unique to the specific Bluetooth device.

6. The method of claim 2, wherein the predetermined threshold strength is unique to the specific model of Bluetooth device.

7. The method of claim 2, further comprising checking for the signal of the first or the second Bluetooth device periodically by the smart device.

8. The method of claim 2, further comprising checking for the signal of the first or the second Bluetooth device by the smart device based on a demand by a user.

9. The method of claim 2, wherein the predetermined signal strength threshold is met when the first or the second Bluetooth device is within a proximity range from the smart device.

10. The method of claim 9, wherein the proximity range is calibrated by a user.

11. The method of claim 9, wherein the proximity range is 1 meter.

12. The method of claim 9, wherein the proximity range is half a meter.

13. The method of claim 2, further comprising alerting a user as to a location of the misplaced first or second Bluetooth device.

14. The method of claim 2, wherein the forecasted weather condition is selected from a group consisting of a temperature, an ultra-violet (UV) light level, a pollution, a pollen count, and a humidity.

15. The method of claim 2, wherein verifying the at least one extrinsic condition includes verifying a time of day, a scheduled activity or an unmet fitness goal.

16. The method of claim 2, wherein verifying the at least one extrinsic condition includes verifying a location of the smart device.

17. The method of claim 2, wherein the first or the second Bluetooth device is selected from a group consisting of a wearable UV sensor, a wearable Blue Light sensor, a wearable pollution sensor, a wearable sweat monitor, a wearable pH monitor, a wearable temperature monitor, a wearable glucose monitor, a personal nametag, a wearable activity monitor, an asset-tracking tag, a proximity marketing beacon, and a navigation beacon.

18. The method of claim 2, wherein the first or the second Bluetooth device is disposable or non-rechargeable.

19. The method of claim 2, wherein the first Bluetooth device and the second Bluetooth device are the same Bluetooth device.

* * * * *